(12) United States Patent
Aniolek et al.

(10) Patent No.: US 8,393,178 B2
(45) Date of Patent: Mar. 12, 2013

(54) THERMAL CONTROL OF THE BEAD PORTION OF A GLASS RIBBON

(75) Inventors: Kenneth William Aniolek, Painted Post, NY (US); Steven Roy Burdette, Big Flats, NY (US); Liam Ruan de Paor, Lexington, KY (US); Eunyoung Park, Elmira, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 13/215,631

(22) Filed: Aug. 23, 2011

(65) Prior Publication Data

US 2011/0302965 A1     Dec. 15, 2011

Related U.S. Application Data

(62) Division of application No. 12/394,523, filed on Feb. 27, 2009, now Pat. No. 8,037,716.

(51) Int. Cl.
*C03B 15/02* (2006.01)
*C03B 17/06* (2006.01)

(52) U.S. Cl. ............................................. 65/204; 65/91

(58) Field of Classification Search ................ 65/97, 91, 65/204
See application file for complete search history.

(56) References Cited

U.S. PATENT DOCUMENTS

| | | | |
|---|---|---|---|
| 3,536,463 A | 10/1970 | Michalik et al. | 65/95 |
| 3,692,508 A | 9/1972 | Prislan | 65/91 |
| 3,775,080 A * | 11/1973 | Brichard | 65/95 |
| 3,909,226 A | 9/1975 | McCourty et al. | 65/97 |
| 4,274,855 A * | 6/1981 | Russell | 65/438 |
| 4,375,370 A | 3/1983 | Mouly | 65/99.5 |
| 6,015,619 A | 1/2000 | Schnabel, Jr. et al. | 428/410 |
| 6,758,064 B1 | 7/2004 | Kariya | 65/91 |
| 7,037,555 B2 * | 5/2006 | Terneu et al. | 427/166 |
| 7,207,193 B2 | 4/2007 | Xun et al. | 65/95 |
| 2005/0122025 A1 | 6/2005 | Kuin et al. | 313/408 |
| 2005/0166639 A1 | 8/2005 | Skeen et al. | 65/104 |
| 2006/0042314 A1 * | 3/2006 | Abbott et al. | 65/25.3 |
| 2006/0179891 A1 | 8/2006 | Ishikawa | 65/435 |
| 2008/0131651 A1 * | 6/2008 | Burdette et al. | 428/98 |
| 2009/0100873 A1 | 4/2009 | Allan et al. | 65/85 |

FOREIGN PATENT DOCUMENTS

| | | |
|---|---|---|
| CN | 101229953 | 7/2008 |
| DE | 102004019014 | 11/2005 |
| EP | 1746076 A1 | 1/2007 |
| JP | 73021324 B * | 6/1973 |
| JP | 2008-030982 | 2/2008 |

(Continued)

*Primary Examiner* — Christina Johnson
*Assistant Examiner* — Cynthia Szewczyk
(74) *Attorney, Agent, or Firm* — Maurice Klee; Jeffrey A. Schmidt

(57) ABSTRACT

Methods and apparatus for controlling the stress in, and the shape of, the glass ribbon (15) formed in a downdraw glass manufacturing process (e.g., the fusion downdraw process) are provided. In certain embodiments, the control is achieved by cooling the bead portions (21a, 21b) of the ribbon (15) at a rate which provides a heat flux $Q''_b$ at the thickest part of the bead (23a, 23b) which is given by $Q''_b = Q''_q + \Delta Q''$, where (i) $Q''_q$ is the heat flux at a transverse position adjacent to the bead portion (21a, 21b) at which the ribbon's thickness equals $1.05 \ast t_{center}$, where $t_{center}$ is the final thickness at the ribbon's center line (17), and (ii) $\Delta Q'' \geq (t_b/t_q - 1)Q''_q + 10$ kilowatts/meter$^2$, where $t_b$ is the thickness of the thickest part of the bead portion. The cooling can take place along the entire length of the ribbon (15) or at selected locations, e.g., in the portion (50) of the draw which includes the glass transition temperature region (31) or the portion (60) of the draw where individual glass sheets (13) are cut from the ribbon (15).

6 Claims, 18 Drawing Sheets

FOREIGN PATENT DOCUMENTS

| | | |
|---|---|---|
| WO | WO2006/083902 | 10/2006 |
| WO | WO2007/014066 | 2/2007 |
| WO | WO2007/037871 | 4/2007 |
| WO | WO2008/036227 | 3/2008 |
| WO | WO2008/068324 | 12/2008 |

* cited by examiner (1)

THERMAL CONTROL OF THE BEAD PORTION OF A GLASS RIBBON

FIELD

This is a divisional of U.S. patent application Ser. No. 12/394,523 filed on Feb. 27, 2009, now U.S. Pat. No. 8,037,716, the content of which is relied upon and incorporated herein by reference in its entirety, and the benefit of priority under 35 USC §120 is hereby claimed.

BACKGROUND

This disclosure relates to the manufacture of glass sheets such as the glass sheets used as substrates in display devices, e.g., liquid crystal displays (LCDs). More particularly, the disclosure relates to methods and apparatus for controlling the stress in, as well as the shape of, the glass ribbon from which such sheets are produced in a downdraw glass manufacturing process (e.g., the fusion downdraw process), as well as the stress in and the shape of glass sheets made from the ribbon.

Display devices are used in a variety of applications. For example, thin film transistor liquid crystal displays (TFT-LCDs) are used in notebook computers, flat panel desktop monitors, LCD televisions, and internet and communication devices, to name only a few.

Many display devices, such as TFT-LCD panels and organic light-emitting diode (OLED) panels, are made directly on flat glass sheets (glass substrates). To increase production rates and reduce costs, a typical panel manufacturing process simultaneously produces multiple panels on a single substrate or a sub-piece of a substrate. At various points in such processes, the substrate is divided into parts along cut lines.

Such cutting changes the stress distribution within the glass, specifically, the in-plane stress distribution seen when the glass is vacuumed flat. Even more particularly, the cutting relieves stresses at the cut line such that the cut edge is rendered traction free. Such stress relief in general results in changes in the vacuumed-flat shape of the glass sub-pieces, a phenomenon referred to by display manufacturers as "distortion." Although the amount of shape change is typically quite small, in view of the pixel structures used in modern displays, the distortion resulting from cutting can be large enough to lead to substantial numbers of defective (rejected) displays. Accordingly, the distortion problem is of substantial concern to display manufacturers and specifications regarding allowable distortion as a result of cutting are challenging.

In addition to producing distortion when glass sheets are cut into sub-pieces, stress, including both residual stress frozen into the glass, which is the source of distortion, and temporary stress, which dissipates as the glass' temperature equilibrates, also affects the shape of the glass ribbon used to manufacture the glass sheets. The shape of the glass ribbon, in turn, affects such processes as sheet separation. In particular, the shape of the ribbon affects both the scoring and subsequent separation of individual sheets from the ribbon, as well as the movement of the ribbon during scoring.

In view of the foregoing, extensive efforts have been made to control the stress in, and the shape of, the glass ribbons used to produce glass sheets in downdraw glass making processes. The present disclosure identifies a source of undesirable stresses and undesirable ribbon shapes, not previously disclosed in the art, and provides methods and apparatus for reducing the adverse effects of these undesirable stresses and shapes on both the glass ribbon and on finished sheets made from the ribbon.

SUMMARY

A method for fabricating sheets of glass is disclosed which includes:

(A) producing a glass ribbon (15) using a drawing process, the ribbon (15) having:
  (i) a center line (17),
  (ii) a first edge (19a),
  (iii) a second edge (19b),
  (iv) a first bead portion (21a) which begins at the first edge (19a) and extends inward towards the center line (17), and
  (v) a second bead portion (21b) which begins at the second edge (19b) and extends inward towards the center line (17), and (B) cutting sheets (13) from the glass ribbon (17);

wherein at a first down-the-draw location, step (A) includes cooling at least one of the bead portions (21a, 21b) at a rate such that the heat flux $Q''_b$ in kilowatts/meter² from the thickest part (23a, 23b) of the bead portion satisfies the relationship:

$$Q''_b = Q''_q + \Delta Q'';$$

where:

(a) each of $Q''_b$, $Q''_q$, and $\Delta Q''$ are heat fluxes from one side of the ribbon (15);

(b) the first down-the-draw location is below the point where the center line (17) and bead portions (21a, 21b) of the ribbon (15) have reached their final thicknesses;

(c) $Q''_q$ is the heat flux in kilowatts/meter² at the first down-the-draw location at a transverse position adjacent to the bead portion (21a, 21b) at which the ribbon's thickness $t_q$ equals $1.05 \ast t_{center}$, where $t_{center}$ is the final thickness of the ribbon at the center line (17); and (d) $\Delta Q'' \geq (t_b/t_q - 1)Q''_q + 10$ kilowatts/meter², where $t_b$ is the thickness of the thickest part (23a, 23b) of the bead portion (21a, 21b).

In addition, a method for fabricating sheets of glass is disclosed which includes:

(A) producing a glass ribbon (15) using a drawing process, the ribbon (15) having:
  (i) a center line (17),
  (ii) a first edge (19a),
  (iii) a second edge (19b),
  (iv) a first bead portion (21a) which begins at the first edge (19a) and extends inward towards the center line (17), and
  (v) a second bead portion (21b) which begins at the second edge (19b) and extends inward towards the center line (17), and (B) cutting sheets (13) from the glass ribbon (15);

wherein at a down-the-draw location, step (A) includes cooling at least one of the bead portions (21a, 21b) at a rate such that the heat flux $Q''_b$ in kilowatts/meter² from the thickest part (23a, 23b) of the bead portion satisfies within ±10% the relationship:

$$Q''_b = Q''_q + \Delta Q'';$$

where:

(a) each of $Q''_b$, $Q''_q$, and $\Delta Q''$ are heat fluxes from one side of the ribbon (15);

(b) the down-the-draw location is below the point where the center line (17) and bead portions (21a, 21b) of the ribbon (15) have reached their final thicknesses;

(c) $Q''_q$ is the heat flux in kilowatts/meter² at the down-the-draw location at a transverse position adjacent to the bead portion (21a, 21b) at which the ribbon's thickness $t_q$ equals $1.05*t_{center}$, where $t_{center}$ is the final thickness of the ribbon (15) at the center line (17);

$$\Delta Q'' = \frac{\rho \cdot C_p \cdot v \cdot t_q}{2} \cdot T'_q \cdot \left( \frac{t_b}{t_q} - 1 \right) \quad (d)$$

where $\rho$ is the glass' density, $C_p$ is the glass' heat capacity, v is the down-the-draw speed of the ribbon (15), $t_b$ is the thickness of the thickest part (23a, 23b) of the bead portion (21a, 21b), and $T'_q$ is the rate of change with distance down the draw of the ribbon's temperature evaluated at the down-the-draw location and at the transverse position where the ribbon's thickness equals $t_q$; and (e) at the down-the-draw location, the temperature of the ribbon at $t_b$ is within ±20° C. of the temperature of the ribbon at $t_q$.

Apparatus is also disclosed for fabricating sheets of glass using a drawing process which produces a ribbon of glass, the ribbon (15) having:
(i) a centerline (17),
(ii) a first edge (19a),
(iii) a second edge (19b),
(iv) a first bead portion (21a) which begins at the first edge (19a) and extends inward towards the center line (17), and
(v) a second bead portion (21b) which begins at the second edge (19b) and extends inward towards the center line (17), where the apparatus has first and second jets (43) for applying a cooling fluid to the first bead portion (21a), wherein the first and second jets (43) are:
(a) located on opposite sides of the ribbon (15);
(b) aimed at substantially the same down-the-draw location and substantially the same transverse position on the first bead (21a); and
(c) oriented so that they point outward towards the first edge (19a).

The reference numbers used in the above summaries are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

The reference numbers used in the figures correspond to the following:

| | |
|---|---|
| 13 | glass sheet (glass substrate) |
| 15 | glass ribbon |
| 17 | center line of ribbon |
| 19a, b | edges of ribbon |
| 21a, b | bead portions of ribbon |
| 23a, b | thickest parts of bead portions |
| 25a, b | inner edges of bead portions |
| 27 | edge rollers |
| 29 | pulling rolls |
| 31 | region of ribbon corresponding to the GTTR |
| 35 | score line |
| 37 | isopipe, i.e., forming structure used in a downdraw fusion process |
| 39 | cavity in isopipe for receiving molten glass |
| 41 | root of isopipe |
| 42 | nozzles |
| 43 | jets |
| 45 | gas supply |
| 47 | continuous gas knife |
| 49 | down-the-draw direction |
| 50 | FDM |
| 60 | BOD |
| 70 | TAM |

DETAILED DESCRIPTION OF THE PREFERRED EMBODIMENTS

The following discussion is in terms of a fusion downdraw process (also known as a fusion process, an overflow downdraw process, or an overflow process), it being understood that the methods and apparatus disclosed and claimed herein are also applicable to other downdraw processes which have bead portions, such as a slot draw process. As fusion apparatus is known in the art, details are omitted so as to not obscure the description of the example embodiments.

Figure 1:
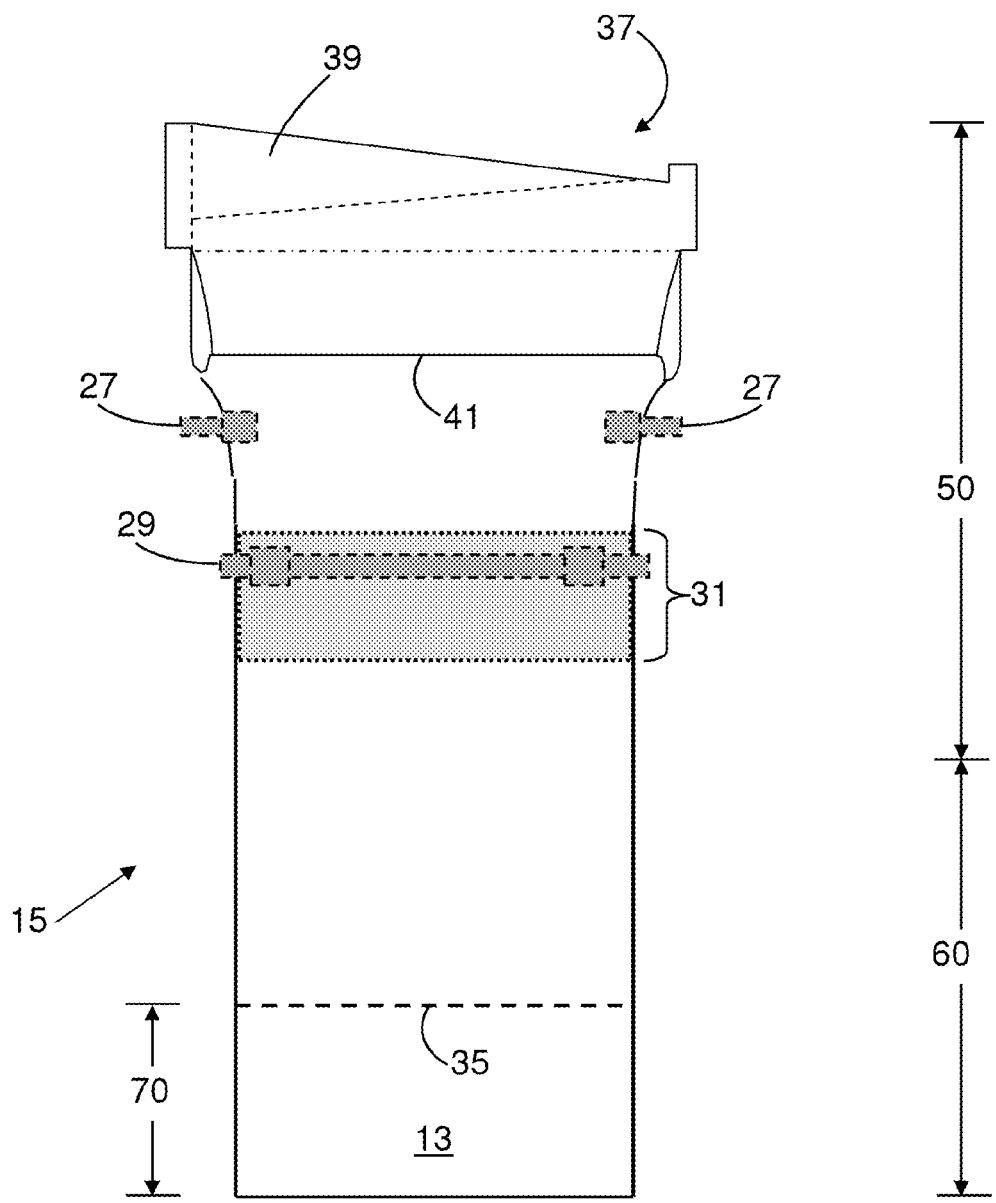
FIG. 1 is a schematic view of a fusion glass fabrication apparatus in accordance with an example embodiment.

As shown in FIG. 1, a typical fusion process employs a forming structure (isopipe) 37, which receives molten glass (not shown) in a cavity 39. The isopipe includes root 41 where molten glass from the isopipe's two converging sides join together to form ribbon 15. After leaving the root, the ribbon first traverses edge rollers 27 and then pulling rolls 29. As it moves down the draw, the glass passes through its glass transition temperature region (GTTR), shown schematically at 31 in FIG. 1. As known in the art, at temperatures above the GTTR, the glass behaves basically like a viscous liquid. At temperatures below the GTTR, the glass behaves basically like an elastic solid. As the glass cools from a high temperature through its GTTR it does not show an abrupt transition from viscous to elastic behavior. Instead, the viscosity of the glass gradually increases, and goes through a visco-elastic regime where both viscous and elastic responses are noticeable, and eventually it behaves as an elastic solid.

Although the GTTR will vary with the particular glass being processed, as representative values for LCD glasses, specifically, Corning Incorporated's Code Eagle 2000 LCD glass, the upper end of the GTTR is typically less than or equal to about 850° C. and the lower end of the GTTR is typically greater than or equal to about 650° C., e.g., the lower end of the GTTR can be greater than or equal to about 700° C.

Edge rollers 27 contact ribbon 15 at a location above the GTTR in FIG. 1, while pulling rolls 29 are shown as being located within the GTTR. Pulling rolls can also be located below the GTTR, if desired. The temperature of the edge rollers is below that of the glass, e.g., the edge rollers are water or air cooled. As a result of this lower temperature, the edge rollers locally reduce the glass' temperature. This cooling reduces the ribbon's attenuation, i.e., the local cooling helps control the reduction in the ribbon's width that occurs during drawing (e.g., through the action of pulling rolls 29). Pulling rolls 29 are also generally cooler than the glass they contact, but because they are located further down the draw, the difference in temperature can be less than at the edge rollers.

As shown in FIG. 1, the apparatus used in the fusion process can be divided into a first section 50 (also referred to herein as the FDM) in which the air temperatures to which the glass is exposed are controlled and a second section 60 (also referred to herein as the BOD) where the glass is exposed to the ambient temperature. The BOD includes a section 70 (also referred to herein as the TAM), where individual sheets 13 are separated from ribbon 15 along score line 35.

Figure 2:
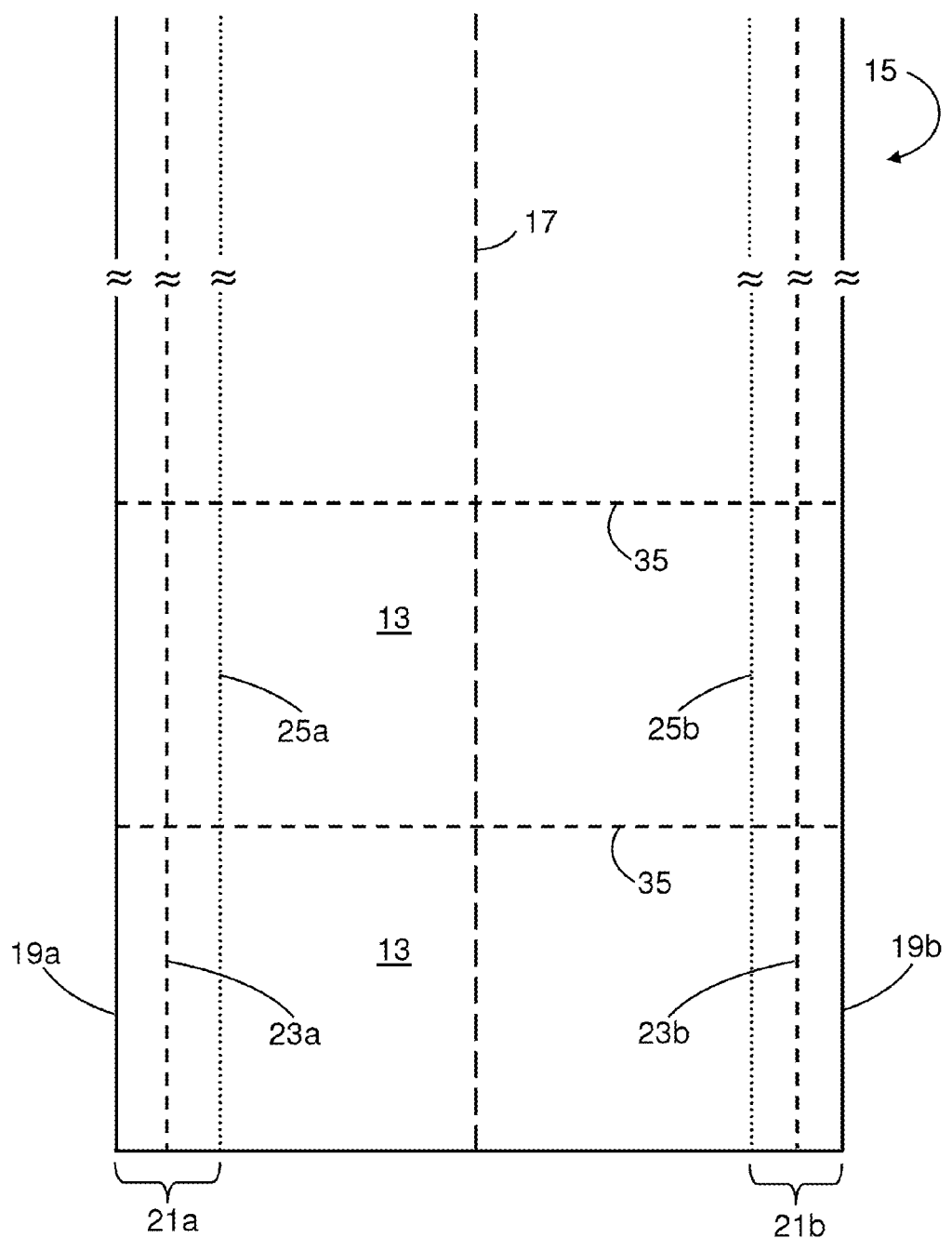
FIG. 2 is a schematic diagram illustrating a glass ribbon formed by a drawing process.

FIG. 2 shows the nomenclature used herein to describe ribbon 15. As shown in this figure, the ribbon has outer edges 19a,19b, a centerline 17, and bead portions 21a,21b, which extend inward from edges 19a,19b towards the centerline.

The thickest part of the bead portion occurs along line 23a (line 23b) and the inner extent of the bead portion is taken to be along line 25a (line 25b), where the final thickness of the ribbon first rises above $1.05*t_{center}$, where $t_{center}$ is the final thickness of the ribbon along the centerline. Note that a thickness of $1.05*t_{center}$ is considered to be a quality or near quality thickness. Also note that as discussed in WO 2007/014066, the final thickness occurs high in the draw, above the GTTR. Thereafter, the thickness decreases slightly as the glass cools based on the glass' coefficient of thermal expansion (CTE). However, for purposes of the present disclosure, such CTE-based contraction can be ignored since it is less than a few tenths of a percent. Although bead portions 21a and 21b are shown as being symmetric in FIG. 2, in practice they can have different widths and the locations of their thickest parts can be different for the two beads, e.g., neither thickest part need be at the center of the bead portion. More generally, it should be noted that FIGS. 1 and 2 are not to scale and are not intended to show relative sizes.

Figure 3:
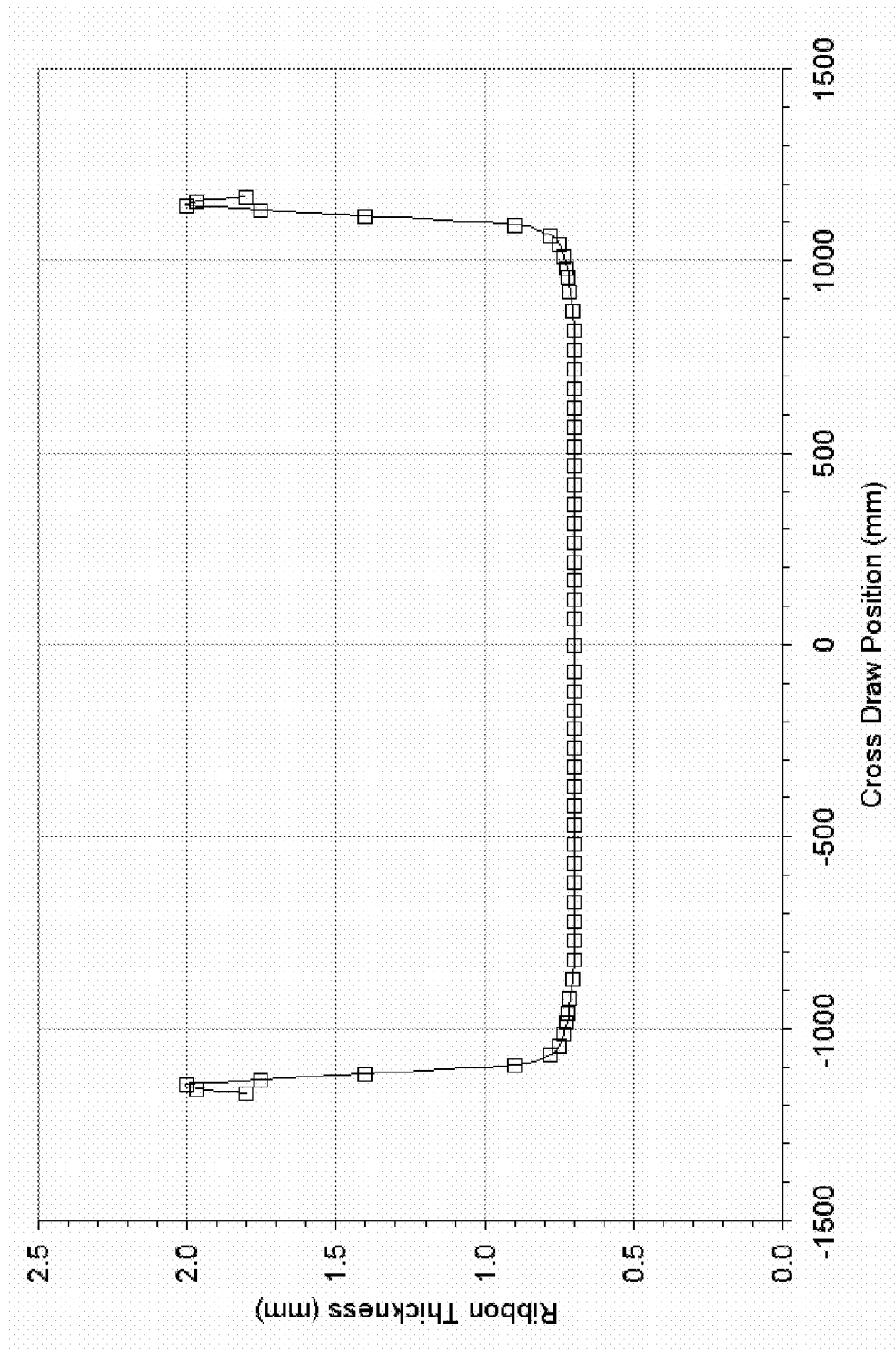
FIG. 3 is a graph showing an example of the variation in glass thickness in the across-the-draw direction produced by a fusion downdraw process.
Figure 4:
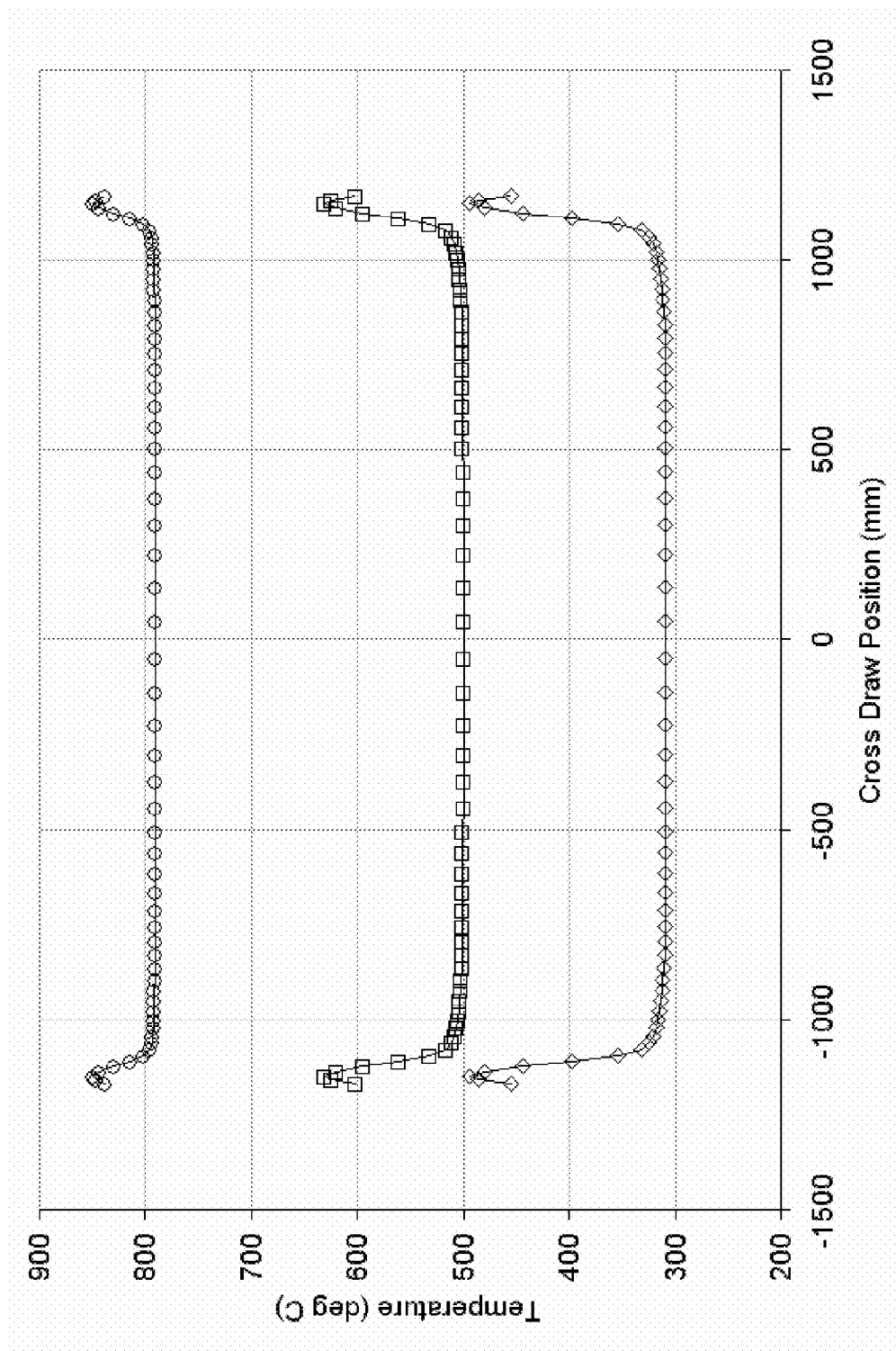
FIG. 4 is a graph showing an example of across-the-draw temperature profiles at different elevations: ○ high in the draw, □ low in the draw, ◇ near the cutting location.
Figure 5:
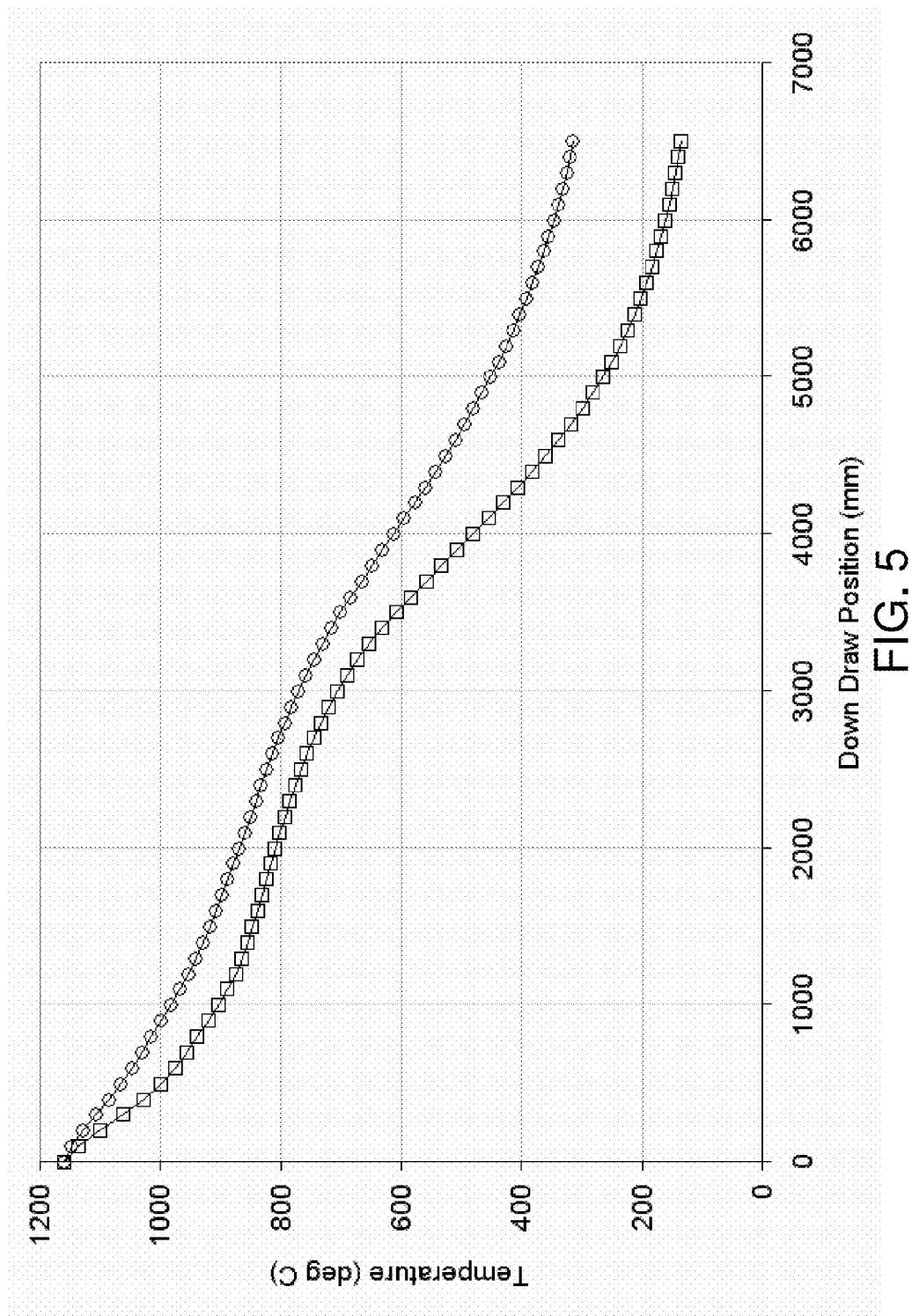
FIG. 5 is a graph showing an example of down-the-draw temperature profiles at different across-the-draw positions: ○ position of greatest bead thickness, □ position where thickness=$1.05*t_{center}$.

As shown in FIG. 3, the cross-draw thickness profile of glass ribbon 15 is non-uniform, with the bead portions of the glass being thicker than the center, often by a factor of 2 or more. This results in a temperature profile that contains a local maxima in the bead portion and for most of the ribbon length the bead is relatively hotter compared to the centerline (see FIGS. 4 and 5). In accordance with the present disclosure, it has been determined that high temperatures in the bead portions cause undesirable stresses and undesirable shapes in both the ribbon and the final glass product. It has been further determined that reducing the bead temperature provides better control of the stresses and shapes of both the ribbon and the final sheets. Importantly, selective alteration of the bead temperature will become even more crucial for stable operation of fusion draw machines producing higher generation glass sheets where ribbon sizes are larger and a significant portion of the ribbon is located below the FDM, which increases the likelihood of ribbon shapes that are difficult to manage.

The cross-draw temperature profile of the glass ribbon in the FDM has previously been controlled by the use of resistance windings and cooling bayonets, the primary target being the quality zone near the center of the ribbon. These heat transfer methods were not intended to and did not substantially alter the bead temperature. Indeed, cooling bayonets are inadequate for this purpose (see below). Additionally, no efforts were made to control the temperature profile of the ribbon in the BOD. Rather, in this region, the glass ribbon was allowed to cool naturally, mainly through free convection and radiation.

As a result of the lack of thermal control, relatively large local temperature gradients have existed in the bead portion of the ribbon. These gradients have led to undesirable ribbon stresses and shapes. These undesirable stresses and shapes, in turn, have resulted in sheet scoring and separation problems, excessive levels of ribbon motion during scoring, and undesirable stresses and shapes of the final glass product. In contrast to these prior practices, this disclosure specifically alters the temperature of the ribbon's bead portion, thus reducing the negative effects associated with high temperature gradients in the bead portion. The bead temperatures can be changed in the FDM, BOD, or both the FDM and the BOD, depending on the particular advantage being sought. The bead cooling is preferably accomplished via convective air jet cooling (see below).

Quantitatively, the amount of cooling needed to control the bead temperature gradient can be determined as follows.

Consider two strips of glass, q (quality or near quality) and b (bead), separated by a small horizontal distance of, for example, 4 inches (10.16 cm) or less. The q strip is, for example, located at the point where the ribbon's final thickness is equal to 1.05 times the final thickness along the ribbon's centerline, while the b strip is located at the point where the bead has its greatest thickness. In general terms, the relationship between the heat flux from the bead $Q_b''$ and the heat flux $Q_q''$ from the quality or near quality region can be written:

$$Q''_b = Q''_q + \Delta Q''$$

(Note that as used herein and in the claims, the direction of $+Q''$ is from the glass to the surroundings)

Further assume that the thinner q strip is at a temperature $T_q$ and is cooling at a rate of $T'_q$, while the thicker b strip is at temperature $T_b$ and cooling at a rate $T'_b$. Both strips are traveling through an edge cooling zone at speed v in the positive y direction. The cooling rate at the q strip is thus given by:

$$T'_q = \frac{d}{dy} T_q$$

with a similar expression for $T'_b$. (Note that as used herein, +y is defined as distance down-the-draw, starting at, for example, the root of the isopipe for a fusion process.)

Defining the thickness of the thin strip as $t_q$, the thickness of the thick strip as $t_b$, the glass' emissivity as $\epsilon$, the glass' density as $\rho$, and the glass' heat capacity as $C_p$, the cooling heat flux from each surface of the thin strip ($Q''_q$) and the cooling heat flux from each surface of the thick strip ($Q''_b$) can be written as:

$$Q''_q = \frac{\rho \cdot C_p \cdot v \cdot t}{2} \cdot \left(\frac{d}{dy} T_q\right) = \frac{\rho \cdot C_p \cdot v \cdot t_q}{2} \cdot T'_q \quad (1)$$

and $$Q''_b = \frac{\rho \cdot C_p \cdot v \cdot t_b}{2} \cdot T'_b \quad (2)$$

In the prior practice using cooling bayonets, the local cooling environment was not substantially changed over a lateral distance of 4 inches (10.16 cm) or less. Thus, the cooling fluxes from the two strips would be substantially the same and if the strips started out at the same temperature, the thicker strip would cool more slowly, i.e., it would have a smaller T' because its t is greater.

In particular, the relationship between $T'_q$ and $T'_b$ can be found as follows.

$$Q''_q = Q''_b$$

$$\frac{\rho \cdot C_p \cdot v \cdot t_q}{2} \cdot T'_q = \frac{\rho \cdot C_p \cdot v \cdot t_b}{2} \cdot T'_b$$

$$T'_b = \frac{t_q}{t_b} \cdot T'_q$$

Thus, in the prior practice, thickness differences between adjacent strips led to the thicker strip cooling more slowly. If, as a result of this slower cooling, the thicker strip obtains a high enough temperature, then its cooling rate will match that of the thinner strip and the cooling rates will become the same. This is observed in practice in some cases.

For some applications, it is desirable to obtain substantially the same cooling rate in adjacent strips that differ in thickness and have substantially the same temperature, i.e., within ±20° C. In order to maintain the same cooling rate under these conditions, additional cooling must be supplied for the thick strip. The magnitude of this additional cooling can be calculated as follows.

$$T'_b = Q''_b \cdot \frac{2}{(\rho \cdot C_p \cdot v \cdot t_b)} = T'_q = Q''_q \cdot \frac{2}{(\rho \cdot C_p \cdot v \cdot t_q)}$$

$$Q''_b = Q''_q \cdot \frac{t_b}{t_q} = Q''_q + \Delta Q''$$

$$\Delta Q'' = Q''_q \cdot \left(\frac{t_b}{t_q} - 1\right) = \frac{\rho \cdot C_p \cdot v \cdot t_q}{2} \cdot T'_q \cdot \left(\frac{t_b}{t_q} - 1\right)$$

As a numerical example, consider a system having a minimum $\rho^* v^* t_q$ product of 0.047 kg/meter–seconds and a $C_p$ value of 1250 Joules/kg–° K. $\Delta Q''$ is then given by:

$$\Delta Q'' = 29.434 \frac{1}{\text{m} \cdot \text{K}} W \cdot \left[T'_q \cdot \left(\frac{t_b}{t_q} - 1\right)\right]$$

Assuming a cooling rate of 3 K/in and a $t_b/t_q$ thickness ratio of 2 leads to an additional cooling requirement per side of:

$$29.434 \frac{1}{\text{m} \cdot \text{K}} W \cdot \left[3 \cdot \frac{\text{K}}{\text{in}} \cdot (2-1)\right] = 3.476 \times 10^3 \cdot \frac{W}{\text{m}^2}$$

Thus, to achieve the same cooling rate at the bead as at a neighboring quality (or near quality) region, $Q''_b$ should exceed $Q''_q$ by at least 3.5 kilowatts/meter$^2$ per side:

$$Q''_b \approx Q''_q + 3.5 \text{ kilowatts/meter}^2.$$

When this equation is satisfied, the temperature difference between the bead and the neighboring quality (or near quality) region is maintained as one moves down the draw.

For other applications, it is desirable to bring the temperature of the bead closer to the temperature of the quality (or near quality) region. For these applications, the magnitude of $\Delta Q''$ is increased. For example, $\Delta Q''$ can be on the order of $(t_b/t_q-1)Q''_q+10$ kilowatts/meter$^2$ per side or above, e.g., $\Delta Q''$ can be $(t_b/t_q-1)Q''_q+25$, $(t_b/t_q-1)Q''_q+50$, $(t_b/t_q-1)Q''_q+75$, or more than $(t_b/t_q-1)Q''_q+100$ kilowatts/meter$^2$ per side, with the higher values being used to, for example, reduce the temperature of the bead below the temperature of the quality (or near quality) region, as may be desired for some applications (see Example 3 below). Once a desired temperature difference between the bead and the quality (or near quality) region is achieved, $\Delta Q''$ can be returned to a value which maintains the difference, e.g., the 3.5 kilowatts/meter$^2$ per side value of the above exemplary calculation. It should be noted that once the extra cooling is stopped, the heat loss from the ribbon returns to its conventional behavior, i.e., the bead's temperature rises with respect to the temperature of the adjacent quality (or near quality) region (see, for example, FIGS. 11, 14, 17, and 20).

Figures 6, 7:
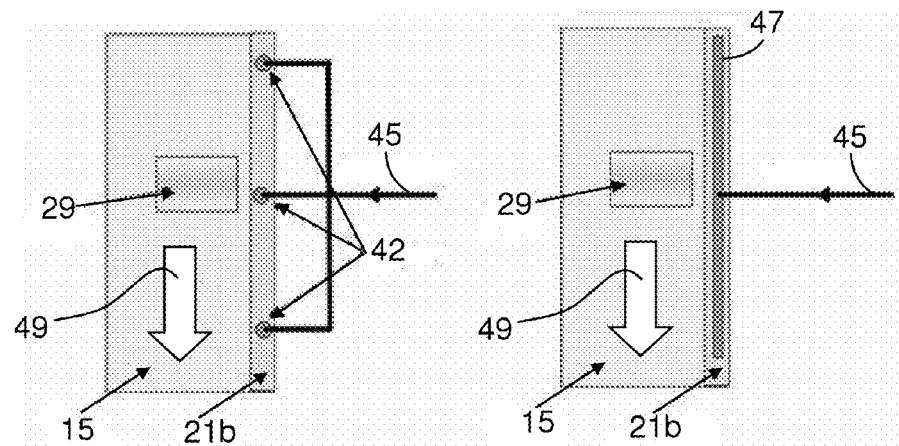
FIG. 6 is a schematic side-view illustrating a gas cooling embodiment in which individual nozzles directed at the bead are placed at discrete down-the-draw locations (a similar arrangement would exist on the other side of the ribbon).
FIG. 7 is a schematic side-view illustrating a gas cooling embodiment in which continuous cooling is performed down the draw through an air knife (a similar arrangement would exist on the other side of the ribbon).
Figures 8, 9:
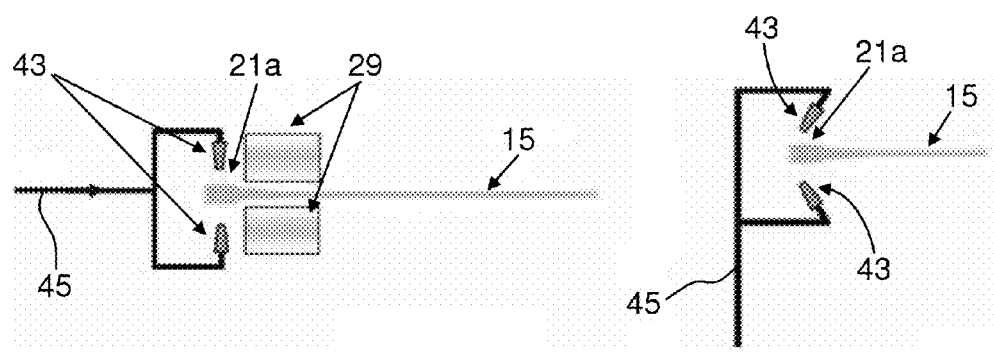
FIG. 8 is a schematic top-view illustrating a gas cooling embodiment via jets directed orthogonally at the bead (a similar arrangement would exist on the other side of the ribbon).
FIG. 9 is a schematic top-view illustrating a gas cooling embodiment via jets oriented at an angle to the ribbon to minimize the impact of the cooling gas on the center of the ribbon (a similar arrangement would exist on the other side of the ribbon).

The preferred method of cooling is by convective cooling with jets 43 which localize the cooling to the bead portions. The jets 43 can be in the form of nozzles 42 of circular or other cross sections (see, for example, FIG. 6) or as a shroud or knife 47 oriented towards the bead providing more continuous cooling (see, for example, FIG. 7). The jets 43 can be orthogonal to the ribbon (see, for example, FIG. 8) or at an angle (see, for example, FIG. 9) to minimize the impact of cooling on the quality portions of the ribbon. Preferably, the opposing jets 43 on the two sides of the ribbon are balanced so as not to move the ribbon in a direction orthogonal to its down-the-draw motion, although in some cases, orthogonal motion may be desired and can be provided by the jets 43.

The cooling medium (fluid) can be air or other non-reactive gasses (e.g., helium which has a high thermal conductivity), or gasses entrained with water vapor for enhanced levels of cooling. Also, a small stream of liquid water can be applied to the bead if a very high level of cooling is desired. In practice, it has been found that circular air nozzles can provide over 100° C. of cooling in 2 mm thick beads with modest (100 scfh) levels of air flow. It should be noted that cooling by radiation heat transfer to cold wands or bayonets located close to the bead portions generally will require inordinately long distances to achieve substantial changes in bead temperature. A few numerical examples will illustrate the problem with radiation heat transfer.

Consider the problem of reducing a temperature difference of 80° K between the bead and the neighboring quality (or near quality) region at the level of the glass' GTTR. Q'' for radiation heat transfer is given by:

$$Q'' = \epsilon \sigma (T_{glass}^4 - T_{sur}^4)$$

where $\epsilon$ is the glass' emissivity, $\sigma$ is the Stefan-Boltzmann constant, $T_{glass}$ is the glass' temperature, and $T_{sur}$ is the temperature of the surface to which the heat is radiating.

For typical GTTR temperatures, to remove an 80° K temperature difference using radiation to a surface held at 20° C., would take on the order of 20-25 inches (50.8 to 63.5 cm). For a location in the TAM region, the distances are even greater. Here the temperature difference between the bead and its neighboring quality (or near quality) region is typically on the order of 140° K. To remove this temperature difference by radiation to a surface at 20° C. would take 200 inches (508 cm), plainly an impractically long length.

Equipment of the type shown in FIGS. 6-9 or other equipment which skilled persons may employ allows bead temperatures to be engineered in a fusion or other downdraw process. Such temperature engineering, in turn, allows for manipulation of both the residual stress from forming and the temporary stress resulting from any non-linearities in the local temperature profile. Both stresses combine to give the overall stress state. Altering the bead temperatures at various locations in the draw allows for manipulation of the stresses of the entire ribbon. Manipulation of the residual and temporary stress leads to various practical advantages, including: alteration of the ribbon shape in both the FDM and the BOD; improved sheet scoring and separation (both of which are dependent on the ribbon shape in the TAM); lower levels of ribbon motion during scoring and separation (which is also dependent on the shape of the ribbon in the TAM); and control of the shape of the final glass sheet (which is dependent on the residual stress).

More particularly, in a representative, but not limiting, application of the cooling techniques and principles discussed herein, the relatively thick bead portions of the glass ribbon are cooled to produce an across-the-draw temperature profile that is substantially flatter than that which would exist in the absence of the cooling. The cooling can occur continuously down the draw from the top of the FDM to the bottom of the BOD where the glass sheet is separated from the ribbon. Or cooling can occur at discrete locations in the FDM and BOD, or just the FDM or BOD. The location of the cooling determines the attribute of the ribbon that is most affected.

For example, cooling high in the FDM (near or in the GTTR) affects residual and nearby temporary stress and therefore the stress and shape of the ribbon and final glass sheet. Cooling low in the FDM or BOD, on the other hand, mostly affects the temporary stress and therefore the ribbon shape low in the draw (although benefits may also include reduced motion and altered stress in the GTTR). The following non-limiting examples, obtained using thermal modeling software, illustrates particular applications of the cooling techniques disclosed herein.

EXAMPLES

Example 1

Figure 10:
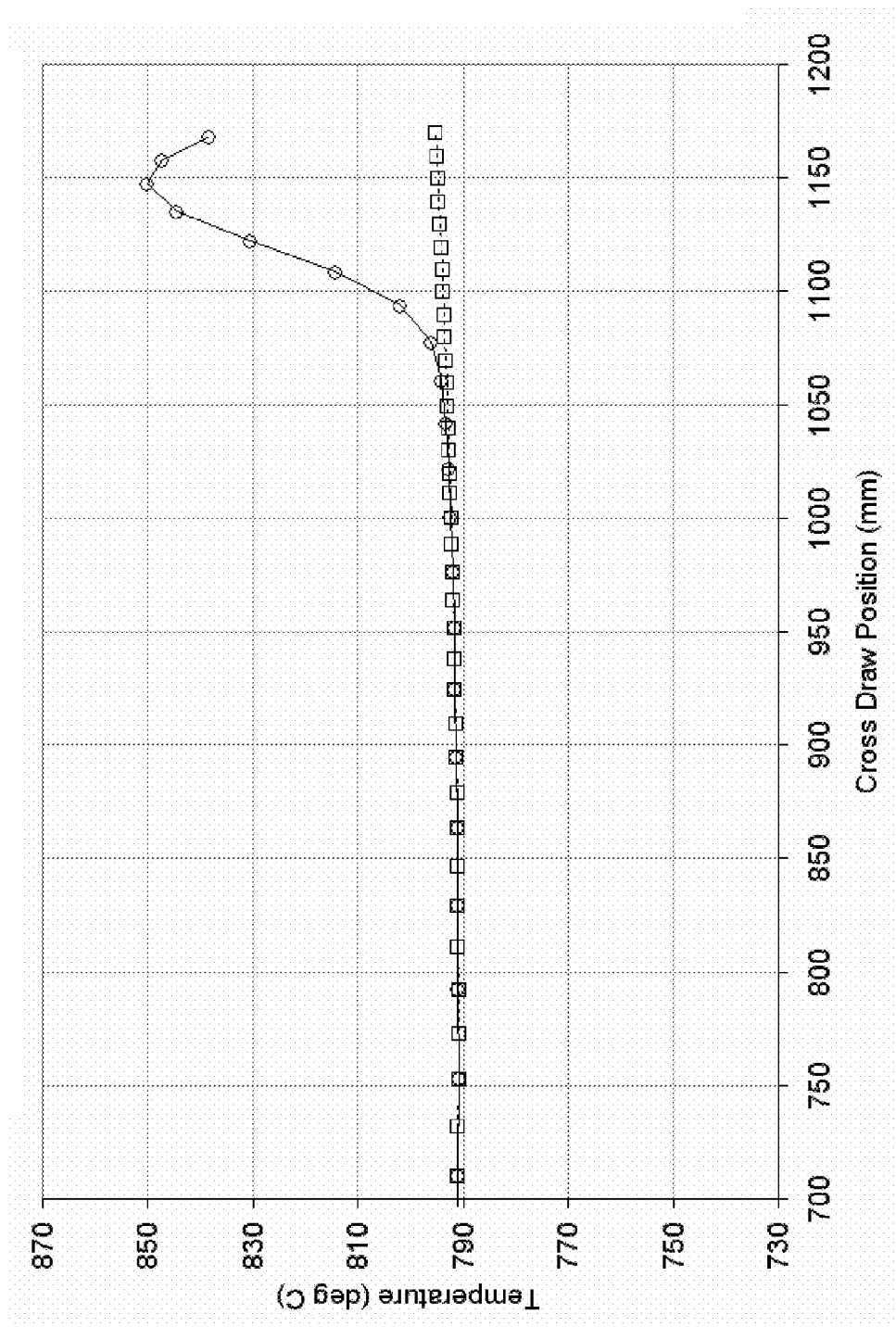
FIG. 10 is a graph illustrating uniform lowering of bead temperature high in the draw to closely match nearby temperatures (the first example). The ○ data points show the across-the-draw temperature profile without bead cooling and the □ data points, with bead cooling.

This example illustrates uniform lowering of bead temperature high in the draw to closely match nearby temperatures. (In this example and in Examples 2-4, the $\rho \cdot C_p \cdot v$ product was assumed to be 160 kW/° K·m².) FIG. 10 compares the across-the-draw temperature profile without bead cooling (○ data points) with the profile with bead cooling (□ data points). (In this and similar figures, the zero point corresponds to the ribbon's centerline.) As can be seen from these two curves, the cooling has provided a substantially flatter across-the-draw temperature profile.

Figure 11:
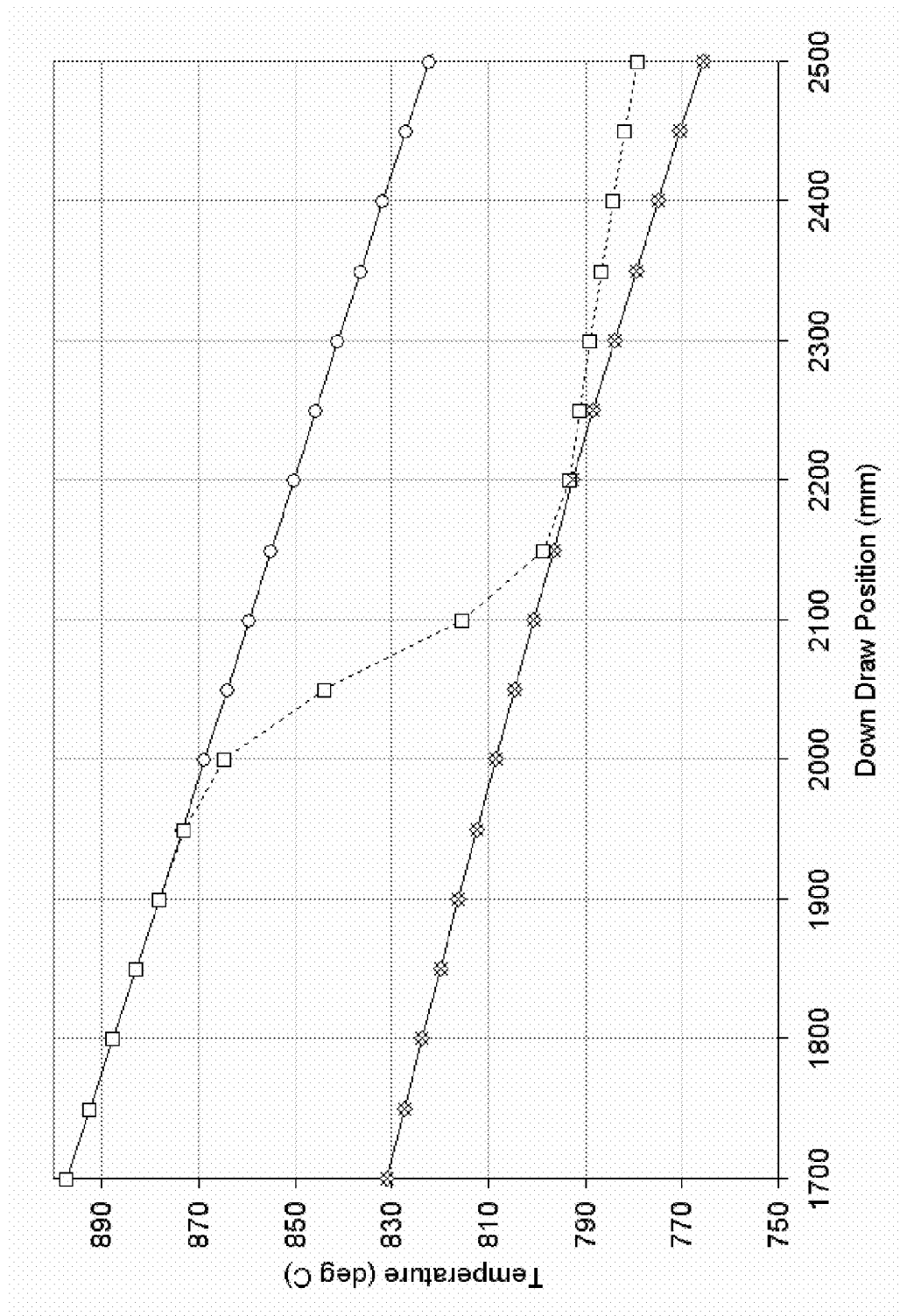
FIG. 11 is a down-the-draw temperature profile for the first example where the ○ data points are for the across-the-draw position where the thickness equals $t_b$ without bead cooling, the □ data points are for the same across-the-draw position with bead cooling, the ◇ data points are for the across-the-draw position where the thickness equals $t_q$ without bead cooling, and the x data points are for the same across-the-draw position with bead cooling.
Figure 12:
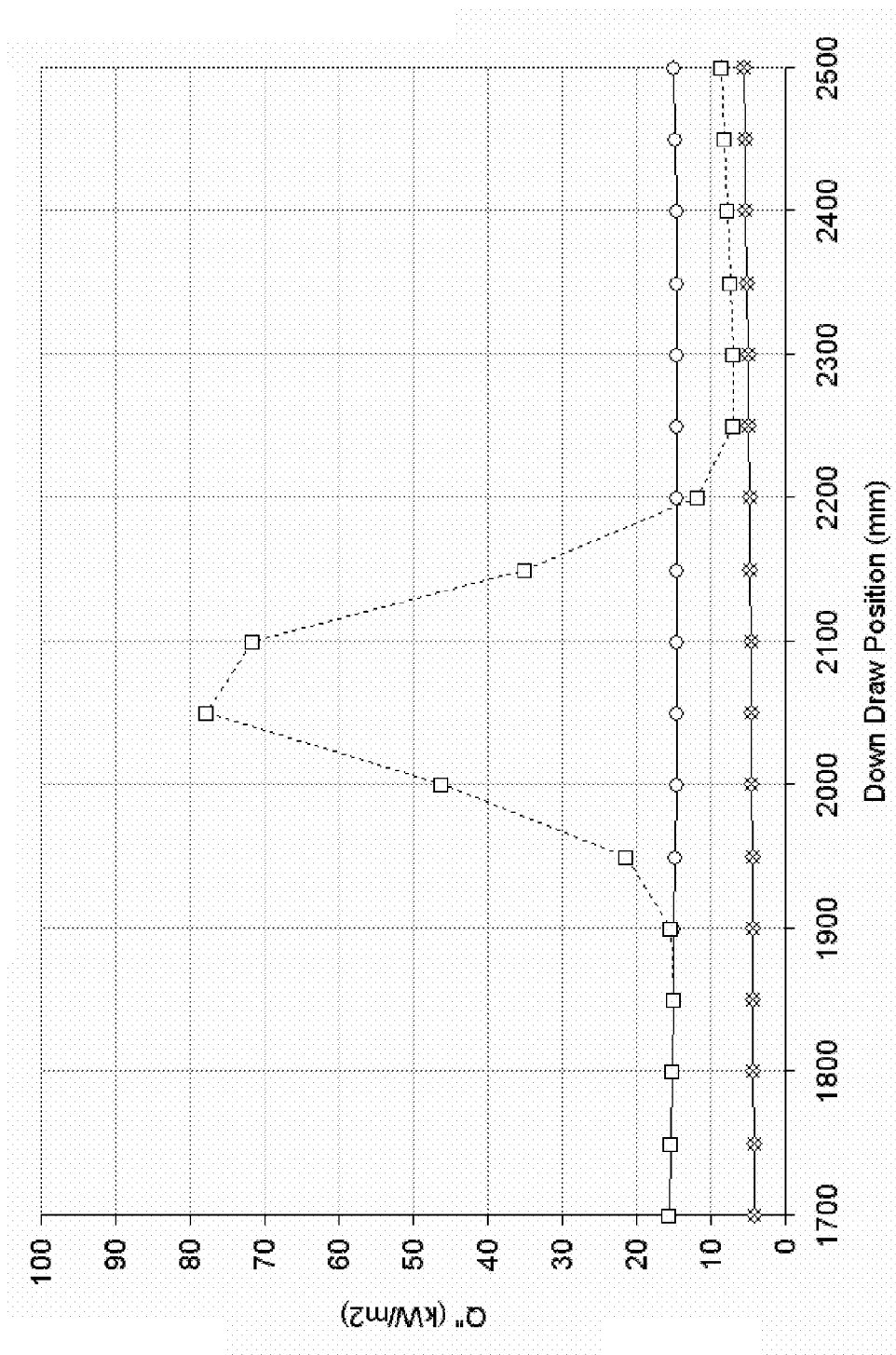
FIG. 12 is a down-the-draw heat flux (Q'') plot for the first example where the ○ data points are for the across-the-draw position where the thickness equals $t_b$ without bead cooling, the □ data points are for the same across-the-draw position with bead cooling, the ◇ data points are for the across-the-draw position where the thickness equals $t_q$ without bead cooling, and the x data points are for the same across-the-draw position with bead cooling.

FIGS. 11 and 12 show down-the-draw temperature and heat flux profiles for this example, where in each case the ○ data points are for the across-the-draw position where the thickness equals $t_b$ without bead cooling, the □ data points are for the same across-the-draw position with bead cooling, the ◇ data points are for the across-the-draw position where the thickness equals $t_q$ without bead cooling, and the x data points are for the same across-the-draw position with bead cooling.

As can be seen in FIG. 12, bead cooling is applied over the span extending from 1900 mm to 2200 mm down the draw, so that Q" reaches a maximum value around 80 kilowatts/meter². As can be seen in FIG. 11, this additional heat flux causes the temperature of the bead (□ data points) to drop until it matches the temperature of the quality (or near quality) neighboring region (x data points) at about 2150 millimeters down the draw, which is the location at which FIG. 10 is plotted. Thereafter, since the cooling has been stopped, the temperature of the bead rises relative to that of the neighboring area as can be seen from the divergence of the □ data points from the x data points. The applied cooling for this example is applied so that substantially no cooling of the neighboring area takes place, as shown by the overlap of the x and ◇ data points.

Figure 21:
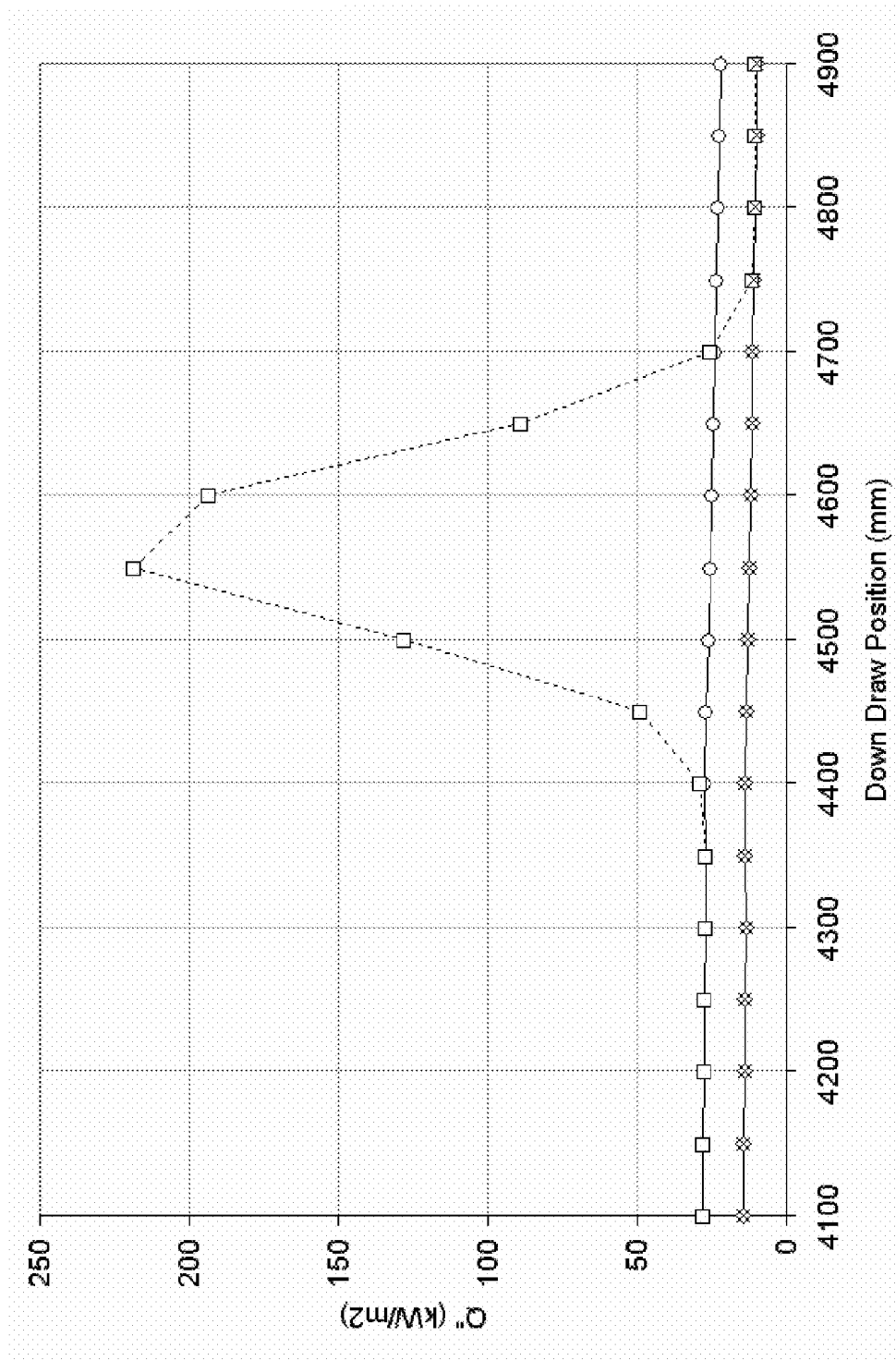
FIG. 21 is a down-the-draw heat flux (Q") plot for the fourth example where the ○ data points are for the across-the-draw position where the thickness equals $t_b$ without bead cooling, the □ data points are for the same across-the-draw position with bead cooling, the ◇ data points are for the across-the-draw position where the thickness equals $t_q$ without bead cooling, and the x data points are for the same across-the-draw position with bead cooling.

It should be noted that the Q" plots of FIG. 12 are directly derivable from the temperature versus distance plots of FIG. 11 using Equations (1) and (2) above. The same is true of FIGS. 15, 18, and 21, i.e., the Q" plots of these figures can be obtained from FIGS. 14, 17, and 20, respectively, using Equations (1) and (2). Moreover, in practice, temperature versus distance plots (both down-the-draw and across-the-draw) are readily measured on an operating draw. Accordingly, both for modeled data and measured data, Q" values can be readily determined by persons skilled in the art.

Example 2

Figure 13:
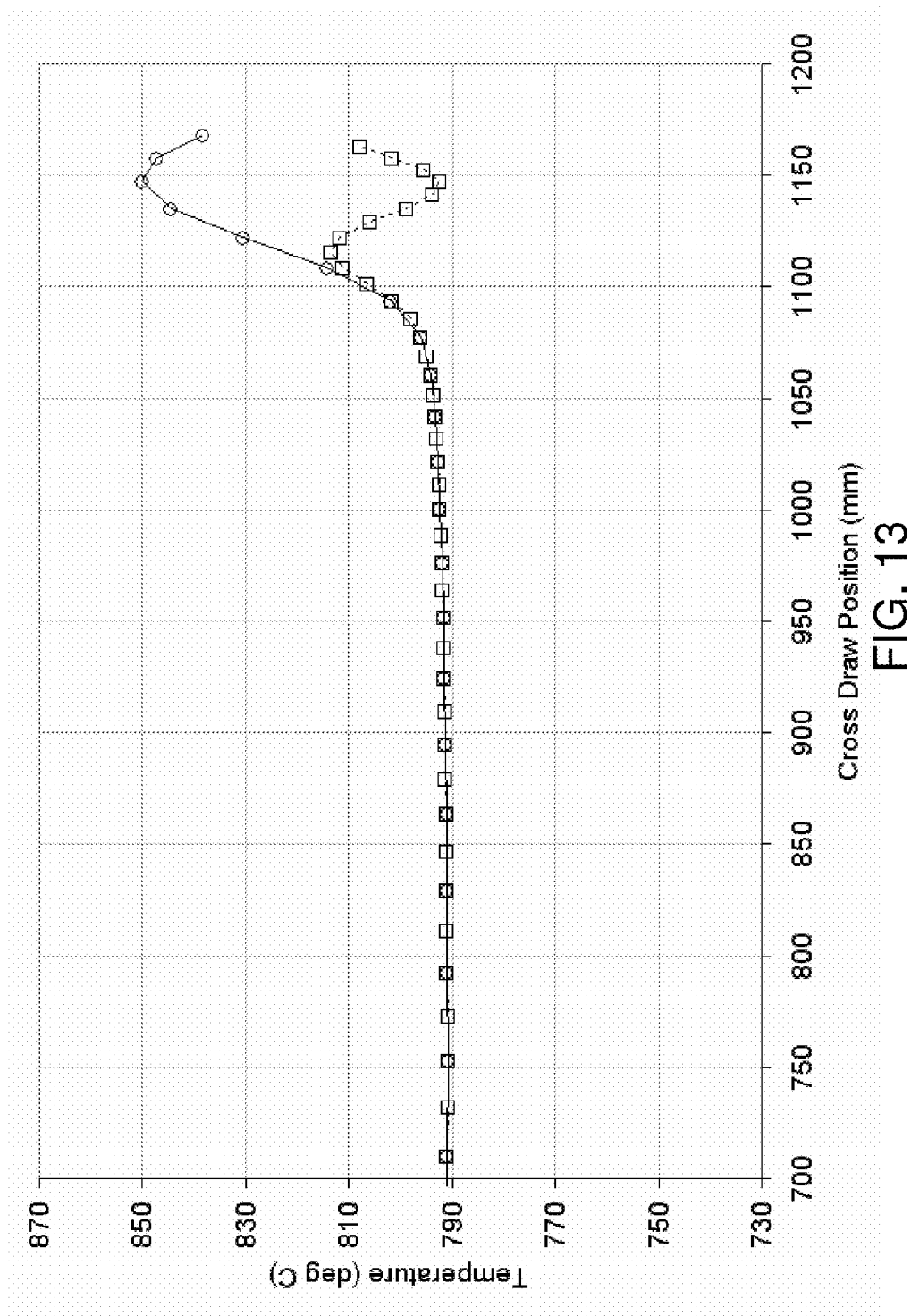
FIG. 13 is a graph illustrating non-uniform under-cooling of bead temperature high in the draw (the second example). The o data points show the across-the-draw temperature profile without bead cooling and the ○ data points, with bead cooling.
Figure 14:
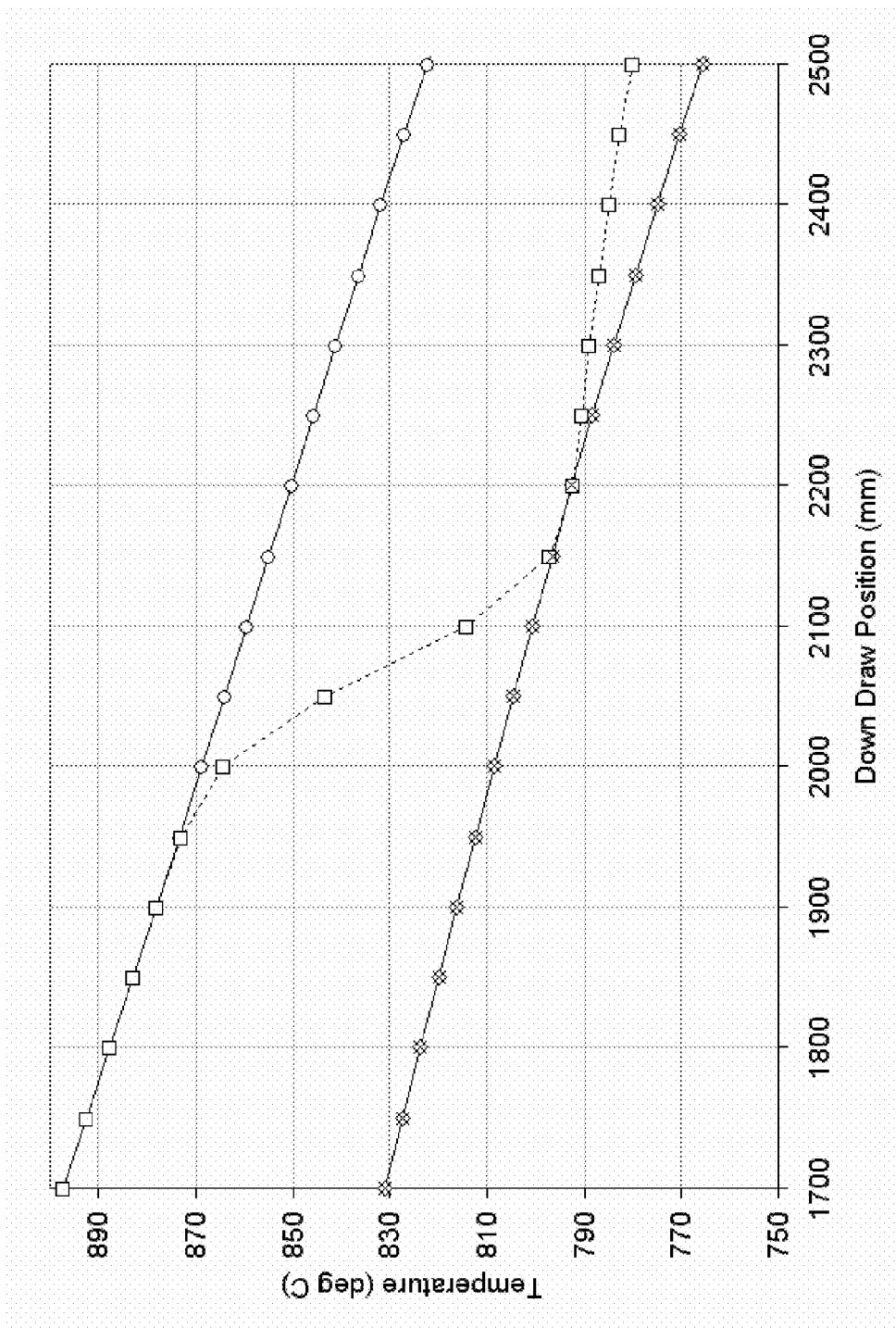
FIG. 14 is a down-the-draw temperature profile for the second example where the ○ data points are for the across-the-draw position where the thickness equals $t_b$ without bead cooling, the □ data points are for the same across-the-draw position with bead cooling, the ◇ data points are for the across-the-draw position where the thickness equals $t_q$ without bead cooling, and the x data points are for the same across-the-draw position with bead cooling.
Figure 15:
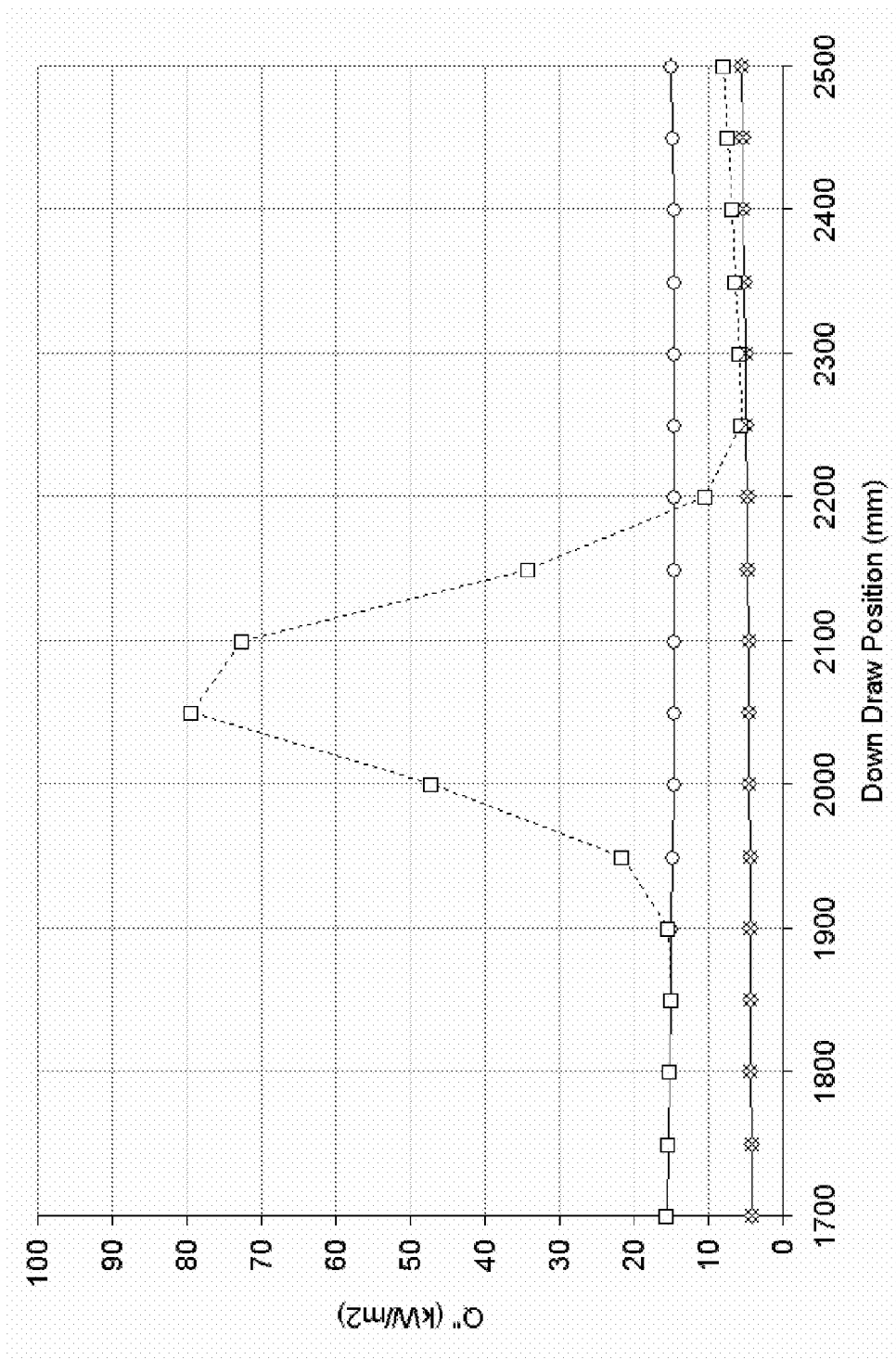
FIG. 15 is a down-the-draw heat flux (Q'') plot for the second example where the ○ data points are for the across-the-draw position where the thickness equals $t_b$ without bead cooling, the □ data points are for the same across-the-draw position with bead cooling, the ◇ data points are for the across-the-draw position where the thickness equals $t_q$ without bead cooling, and the x data points are for the same across-the-draw position with bead cooling.

This example illustrates non-uniform under-cooling of bead temperature high in the draw. As in Example 1, FIG. 13 compares the across-the-draw temperature profile without bead cooling (○ data points) with the profile with bead cooling (□ data points). As can be seen from these two curves, the cooling has provided a substantially flatter across-the-draw temperature profile, but not as flat as in Example 1. In particular, the temperature at the thickest point of the bead has been made substantially equal to the temperature in the neighboring quality (or near quality) region, but the temperatures on either side of the thickest point are higher than the neighboring temperature. FIGS. 14 and 15 show the down-the-draw temperature and Q" profiles for this case.

Example 3

Figure 16:
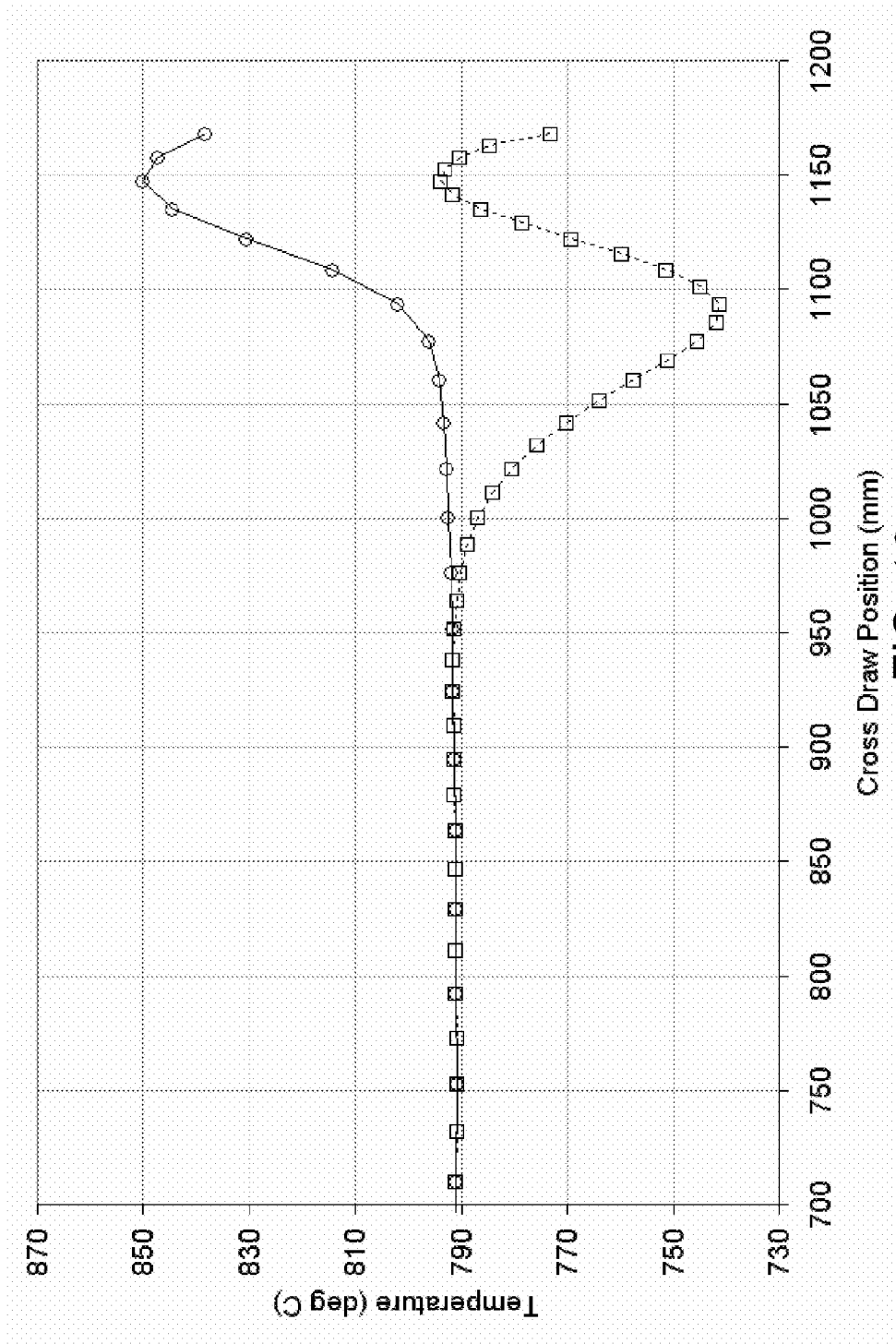
FIG. 16 is a graph illustrating non-uniform over-cooling of bead temperature high in the draw (the third example). The ○ data points show the across-the-draw temperature profile without bead cooling and the □ data points, with bead cooling.

This example illustrates non-uniform over-cooling of bead temperature high in the draw. As in Examples 1 and 2, FIG. 16 compares the across-the-draw temperature profile without bead cooling (○ data points) with the profile with bead cooling (□ data points). As can be seen from these two curves, rather than substantially flattening the across-the-draw temperature profile, in this case, the profile with cooling exhibits temperature variations that are similar in magnitude, but opposite in sign, from those without cooling. Such a profile can be of value when it is desired to introduce a shape or stress distribution in the ribbon opposite to that which would be generated without cooling.

Figure 17:
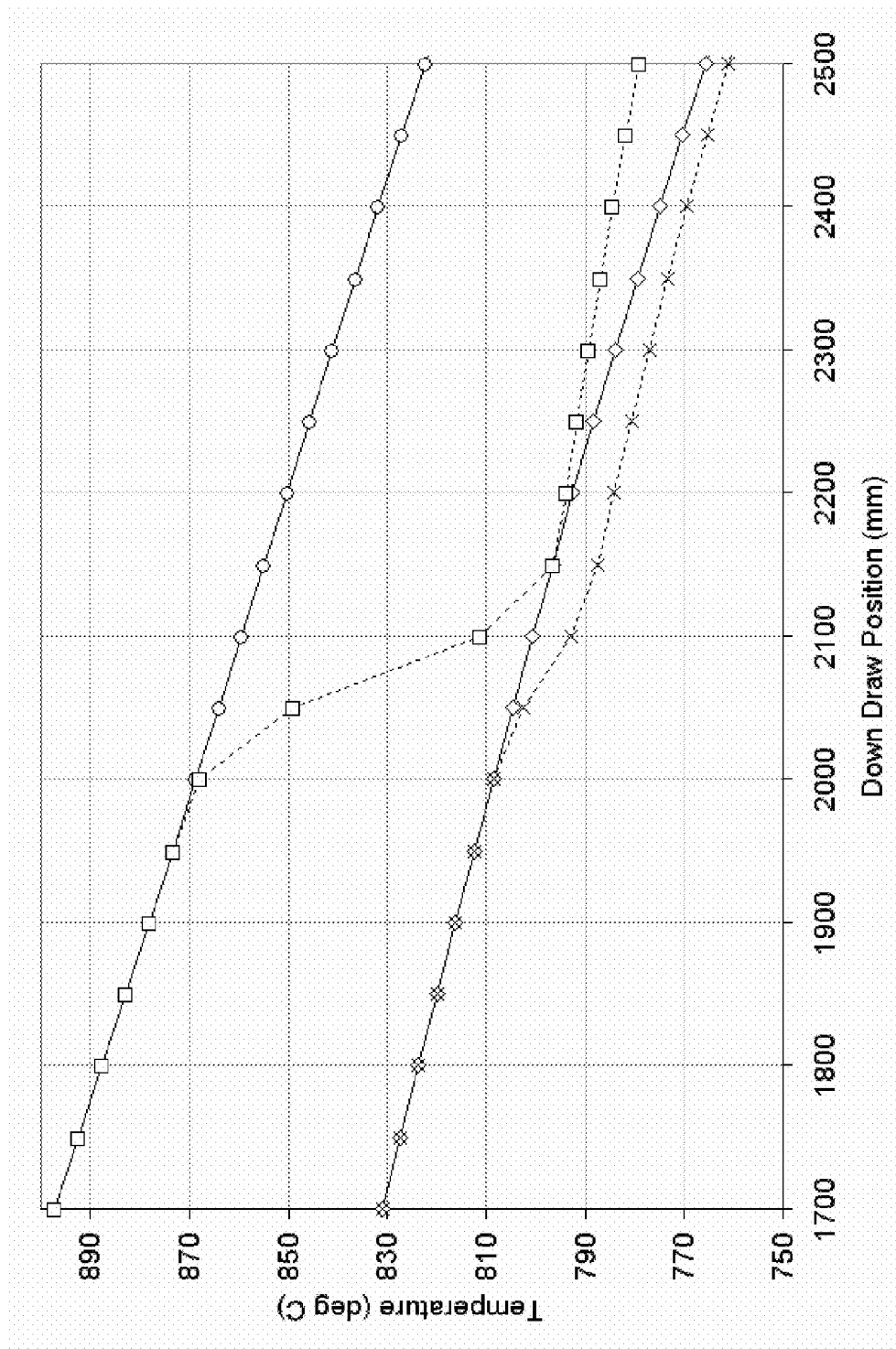
FIG. 17 is a down-the-draw temperature profile for the third example where the ○ data points are for the across-the-draw position where the thickness equals $t_b$ without bead cooling, the □ data points are for the same across-the-draw position with bead cooling, the ◇ data points are for the across-the-draw position where the thickness equals $t_q$ without bead cooling, and the x data points are for the same across-the-draw position with bead cooling.
Figure 18:
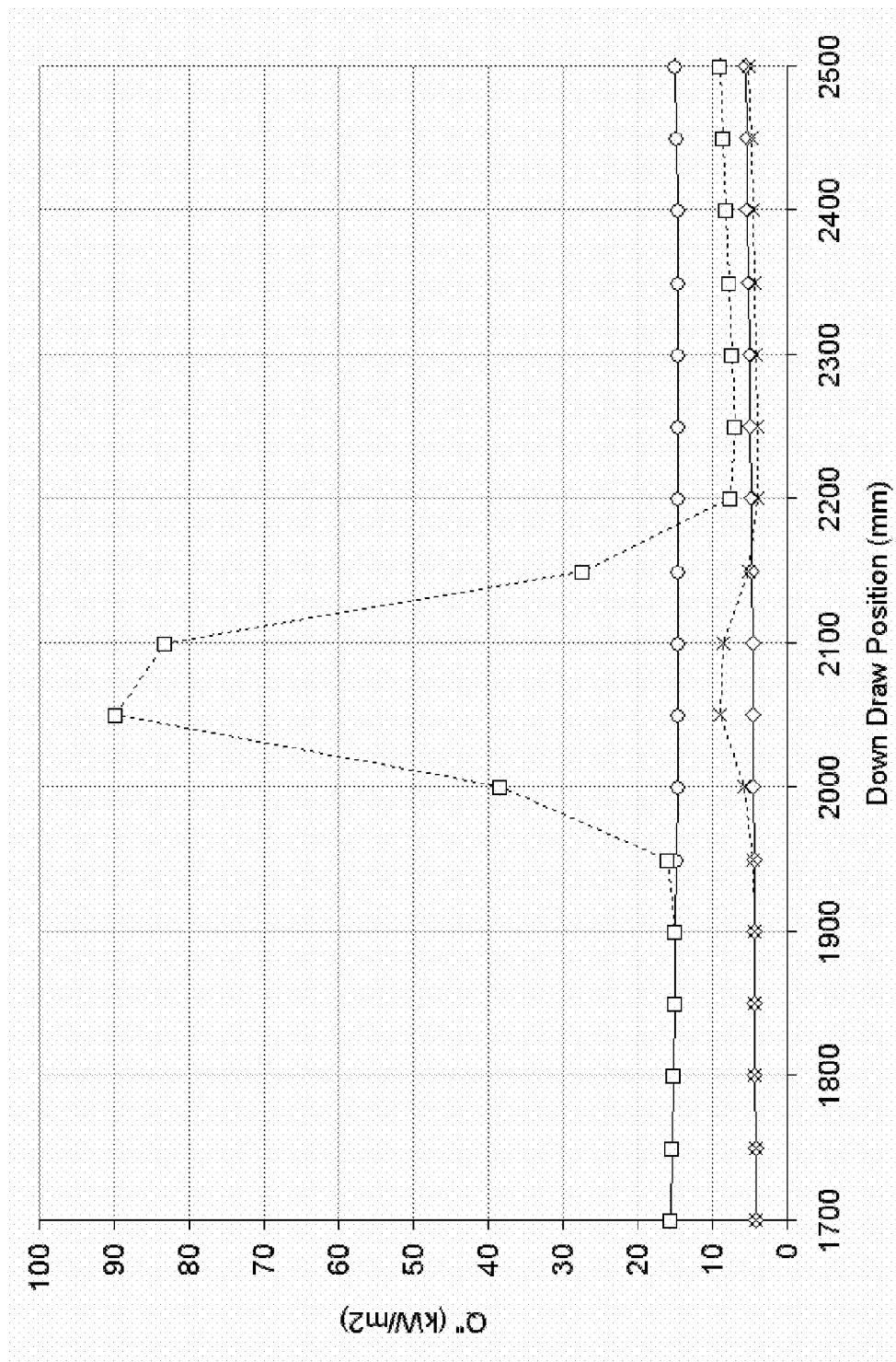
FIG. 18 is a down-the-draw heat flux (Q") plot for the third example where the ○ data points are for the across-the-draw position where the thickness equals $t_b$ without bead cooling, the □ data points are for the same across-the-draw position with bead cooling, the ◇ data points are for the across-the-draw position where the thickness equals $t_q$ without bead cooling, and the x data points are for the same across-the-draw position with bead cooling.

FIGS. 17 and 18 show the down-the-draw temperature and Q" profiles for this case. Because the applied cooling is stronger for this case, both the temperature profile and the Q" profile at $t_q$ are changed when the bead cooling is applied (compare the ◇ data points (no bead cooling) with the x data points (bead cooling)). Also, because this case involves over-cooling, the maximum Q" value in FIG. 18 is approximately 90 kilowatts/meter², which is approximately 10 kilowatts/meter² higher than the maximum values in FIGS. 12 and 15.

Example 4

Figure 19:
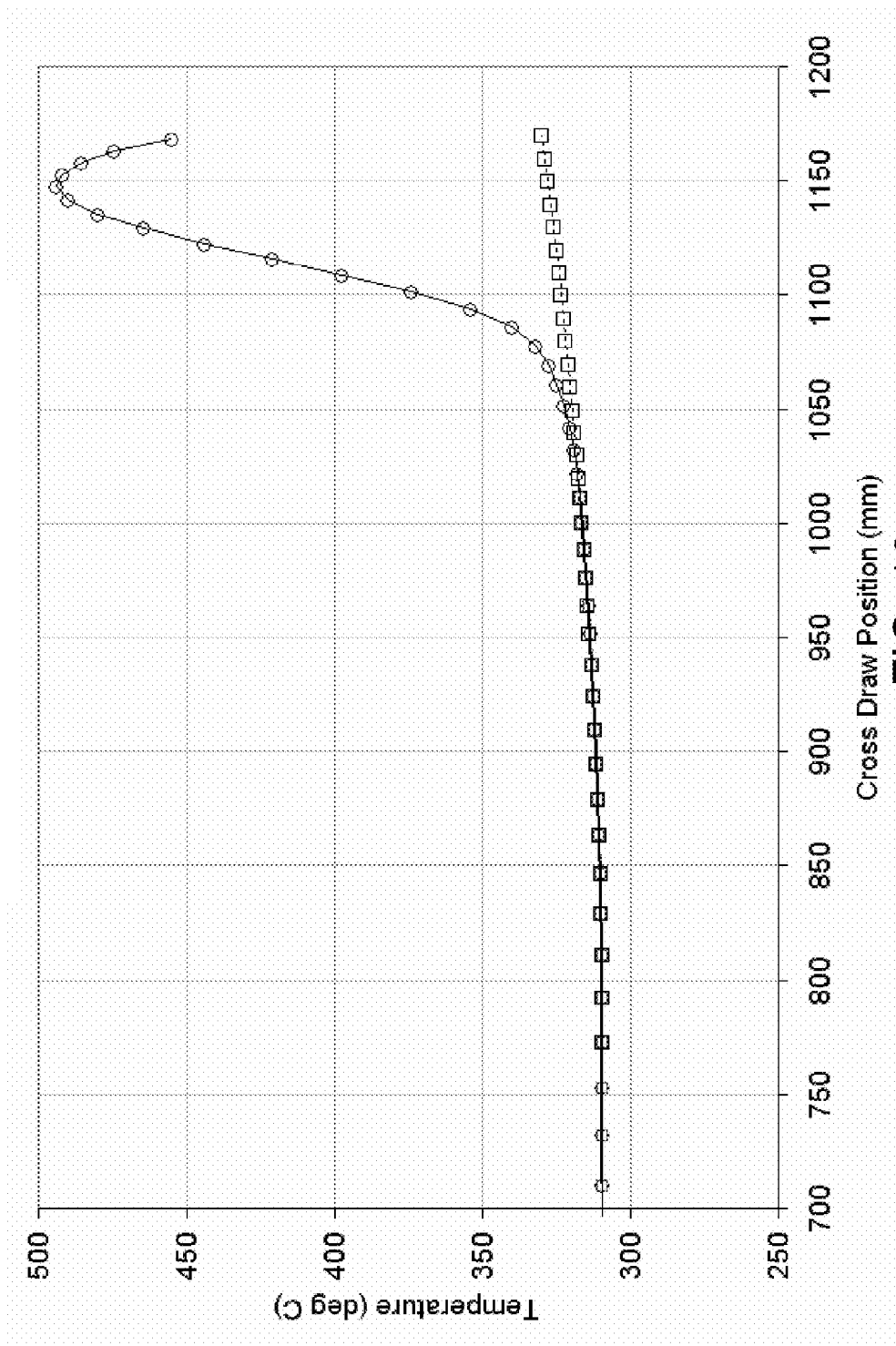
FIG. 19 is a graph illustrating uniform lowering of bead temperature near the cutting location to closely match nearby temperatures (the fourth example). The ○ data points show the across-the-draw temperature profile without bead cooling and the □ data points, with bead cooling.
Figure 20:
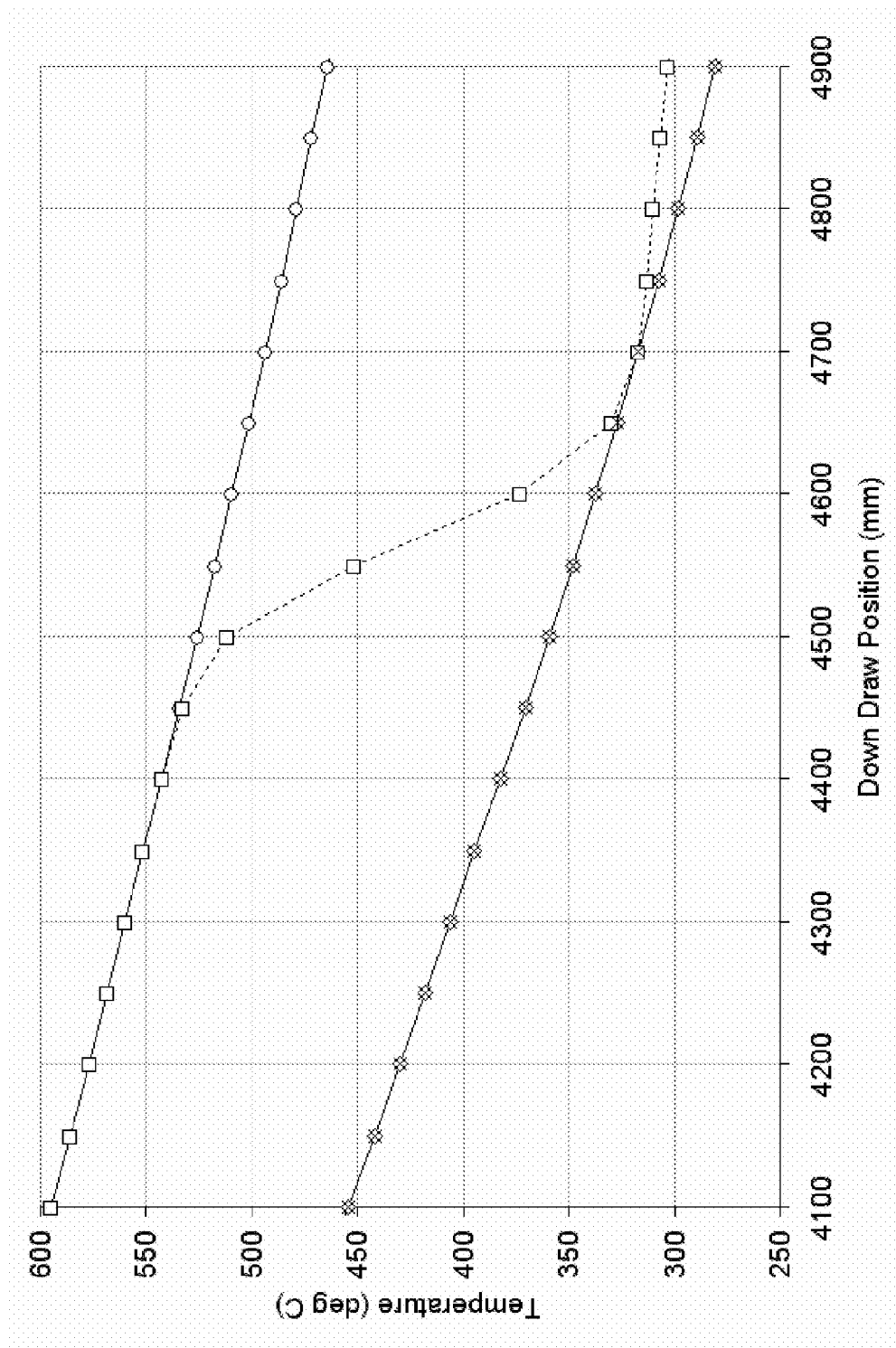
FIG. 20 is a down-the-draw temperature profile for the fourth example where the ○ data points are for the across-the-draw position where the thickness equals $t_b$ without bead cooling, the □ data points are for the same across-the-draw position with bead cooling, the ◇ data points are for the across-the-draw position where the thickness equals $t_q$ without bead cooling, and the x data points are for the same across-the-draw position with bead cooling.

This example illustrates uniform lowering of bead temperature near the cutting location, i.e., in the TAM region, to closely match nearby temperatures. As can be seen in FIG. 19, the difference between the across-the-draw temperature profiles without bead cooling (○ data points) and with bead cooling (□ data points) is even greater than in Examples 1-3 because, without cooling, the difference between the bead temperature and the neighboring temperature is much larger in the TAM region than high in the draw. The Q" values needed to flatten out this difference are correspondingly much greater in this example than in Examples 1-3 (compare FIG. 21 with FIGS. 12, 15, and 18; note difference in vertical scales).

As the foregoing examples illustrate, using Q" values readily achieved with convective cooling, across-the-draw temperature distributions of a variety of types can be obtained both high in the draw and at the bottom of the BOD. Such temperature distributions, in turn, can be used to achieve a variety of shapes and stress distributions useful in the manufacture of sheet glass by downdraw process, such as the fusion process.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

What is claimed is:

1. Apparatus for fabricating sheets of glass using a drawing process which produces a ribbon of glass, the ribbon having:
   (i) a center line,
   (ii) a first edge,
   (iii) a second edge, (iv) a first bead portion which begins at the first edge and extends inward towards the center line, and
(v) a second bead portion which begins at the second edge and extends inward towards the center line,
the apparatus comprising first and second jets for applying a cooling fluid to the first bead portion, wherein the first and second jets are:
(a) located on opposite sides of the ribbon;
(b) aimed at substantially the same down-the-draw location and substantially the same transverse position on the first bead; and
(c) oriented at an angle and pointed away from the center line of the glass ribbon so that the first and second jets point outward towards the first edge.

2. The apparatus of claim 1 further comprising third and fourth jets for applying a cooling fluid to the second bead portion, wherein the third and fourth jets are:
(a) located on opposite sides of the ribbon;
(b) aimed at substantially the same down-the-draw location and substantiality the same transverse position on the second bead; and
(c) oriented at an angle and pointed away from the center line of the glass ribbon so that the third and fourth jets point outward towards the second edge.

3. The apparatus of claim 1 wherein the fluid is air.

4. The apparatus of claim 1 wherein the fluid is air combined with water vapor.

5. The apparatus of claim 1 wherein the fluid is liquid water.

6. The apparatus of claim 1, wherein the jets are disposed at a non-ninety-degree angle relative to a quality surface of the ribbon.

* * * * *